United States Patent
Keohane et al.

(10) Patent No.: US 7,111,325 B2
(45) Date of Patent: Sep. 19, 2006

(54) APPARATUS, SYSTEM AND METHOD OF DOUBLE-CHECKING DNS PROVIDED IP ADDRESSES

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 10/171,841

(22) Filed: Jun. 13, 2002

(65) Prior Publication Data

US 2004/0003113 A1 Jan. 1, 2004

(51) Int. Cl.
*G06F 11/22* (2006.01)
*G06F 11/32* (2006.01)
*G06F 11/36* (2006.01)
*G06F 12/16* (2006.01)
*G06F 15/18* (2006.01)
*G06F 15/16* (2006.01)
*G08B 23/00* (2006.01)

(52) U.S. Cl. .................... 726/22; 726/23; 726/25; 709/245

(58) Field of Classification Search .................. None
See application file for complete search history.

(56) References Cited

U.S. PATENT DOCUMENTS

| | | | |
|---|---|---|---|
| 6,810,411 B1 * | 10/2004 | Coughlin et al. | 709/203 |
| 7,013,482 B1 * | 3/2006 | Krumel | 709/229 |
| 2002/0138634 A1 * | 9/2002 | Davis et al. | 709/229 |

* cited by examiner

*Primary Examiner*—Kambiz Zand
*Assistant Examiner*—Benjamin E. Lanier
(74) *Attorney, Agent, or Firm*—Volel Emile; Mark E. McBurney; D'Ann N. Rifai

(57) ABSTRACT

A system, apparatus and method of notifying a user that there may be a possibility of communicating with a computer system other than an intended one are provided. When a host in use by the user is to request a DNS name service, the request is sent to two or more DNS servers. If all the servers return the same IP address, then there is a likelihood that the user may communicate with the intended computer system. If, however, two or more different IP addresses are returned, there is a high likelihood that the user may communicate with a computer system other than the intended one. When this occurs a warning is generated notifying the user of such a likelihood.

24 Claims, 4 Drawing Sheets

APPARATUS, SYSTEM AND METHOD OF DOUBLE-CHECKING DNS PROVIDED IP ADDRESSES

BACKGROUND OF THE INVENTION

1. Technical Field

The present invention is directed to network computing. More specifically, the present invention is directed to a method, system and apparatus for double-checking DNS provided IP addresses.

2. Description of Related Art

Domain Name System or Service (DNS) is an Internet service that translates domain names into Internet Protocol (IP) addresses. IP addresses, which are a group of four numbers separated by colons (e.g., 198.105.232.4), are used when communicating with computer systems on the Internet. However, since it is easier to remember names than it is to remember numbers, users are allowed to use computer names (i.e., www.ibm.com) when communicating with computer systems. The names are then translated into their corresponding IP addresses.

When a process needs to determine an IP address given a DNS name, it calls upon a local host to map the DNS name to an IP address. Specifically, UNIX hosts have a file (i.e., /etc/resolv.conf) that contains a list of DNS servers that can be contacted to map DNS names to IP addresses. The DNS servers are contacted, if some or all of them on the list have to be contacted, in an orderly fashion. For example, one DNS server in the list is usually designated as the default server to contact when a DNS service is needed. Thus, that DNS server will be contacted first. However, if communication between the client and the DNS server fails, another DNS server in the list, which is designated as a secondary server, will be contacted and so on.

The DNS servers have a table that cross-references a computer system's name with its IP address. If the computer system's name being looked up is not in the cross-referencing table of the DNS server contacted, that DNS server will contact another DNS server to see whether it can map the computer system's name to its IP address. This process will continue until a DNS server is able to provide the IP address associated with the DNS name of the computer system in question. The IP address will be passed down to the requesting client in the same order the request was passed up. Each DNS server that was involved in passing the request up the chain will be involved in passing the answer down to the requesting client. When they receive the answer, they will cache it for future references. The process of one DNS server requesting another DNS server to map a DNS name to its IP address is called a recursive resolution of requests.

Users have been known to intercept DNS service requests between two DNS servers and to return IP addresses of their choosing in response to the requests. When this occurs, all communications between a client that requested a DNS service and the computer system for which the DNS service was requested will effectively be routed to the users' chosen computer system.

This scheme can be used to compromise secure transactions between customers and financial institutions or commercial enterprises. For example, a customer who believes that he/she is in a financial transaction with a bank may nonchalantly provide all pertinent information that an unauthorized user may need to access the customer's bank account or credit card account etc. Further, enterprises that are being run by unscrupulous managers may re-route all Internet traffic destined to a competitor's Website to the enterprises' own Websites. Indeed, a whole host of deceptive activities may ensue by using this scheme.

Thus, what is needed is a system, apparatus and method of notifying a user when there is a possibility that the user may be communicating with other than an intended computer system.

SUMMARY OF THE INVENTION

The present invention provides a system, apparatus and method of notifying a user that there may be a possibility of communicating with a computer system other than an intended one. When a host in use by the user is to request a DNS name service, the request is sent to two or more DNS servers. If all the servers return the same IP address, then there is a likelihood that the user may communicate with the intended computer system. If, however, two or more different IP addresses are returned, there is a high likelihood that the user may communicate with a computer system other than the intended one. When this occurs a warning is generated notifying the user of such a likelihood.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
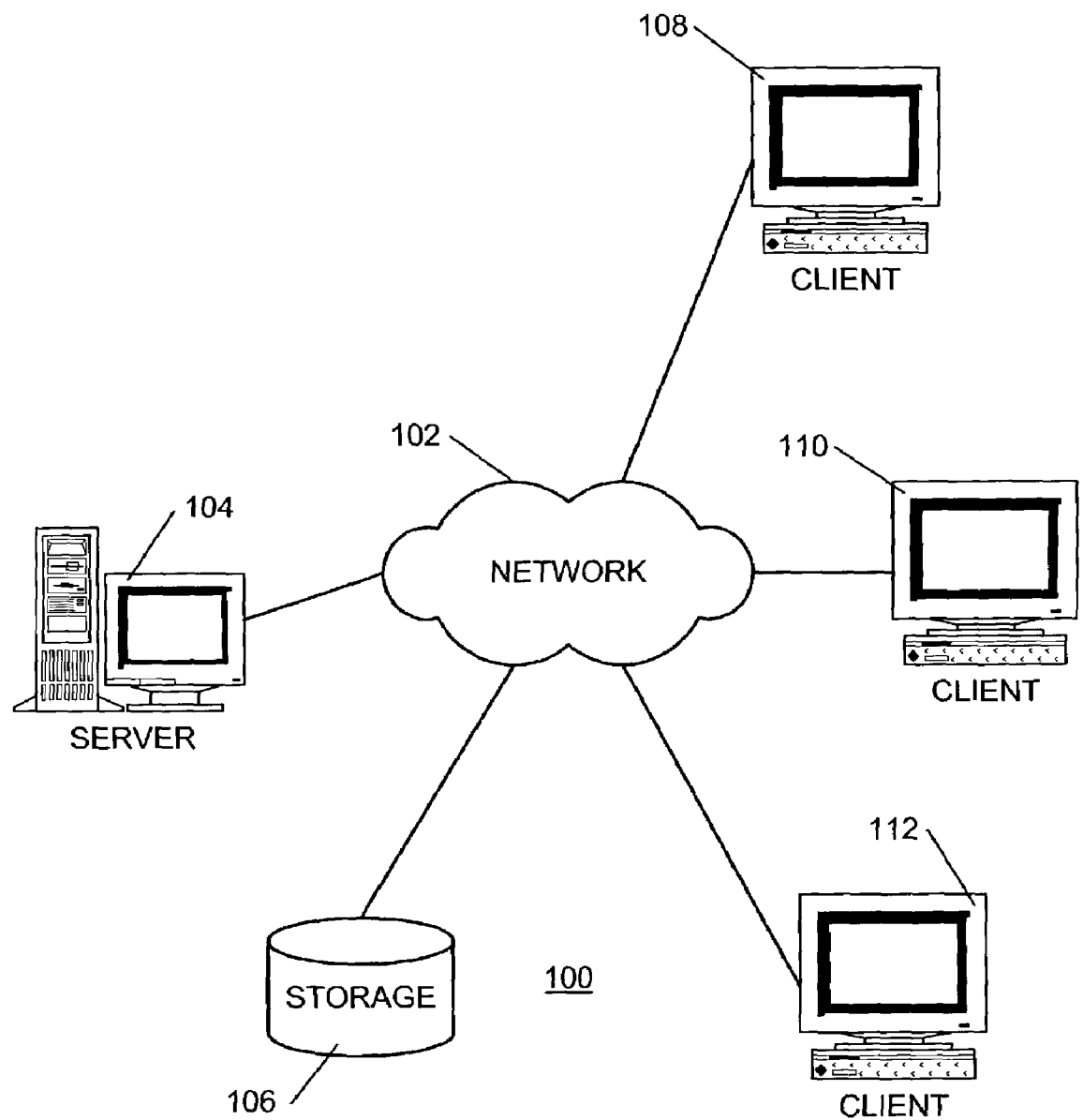
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
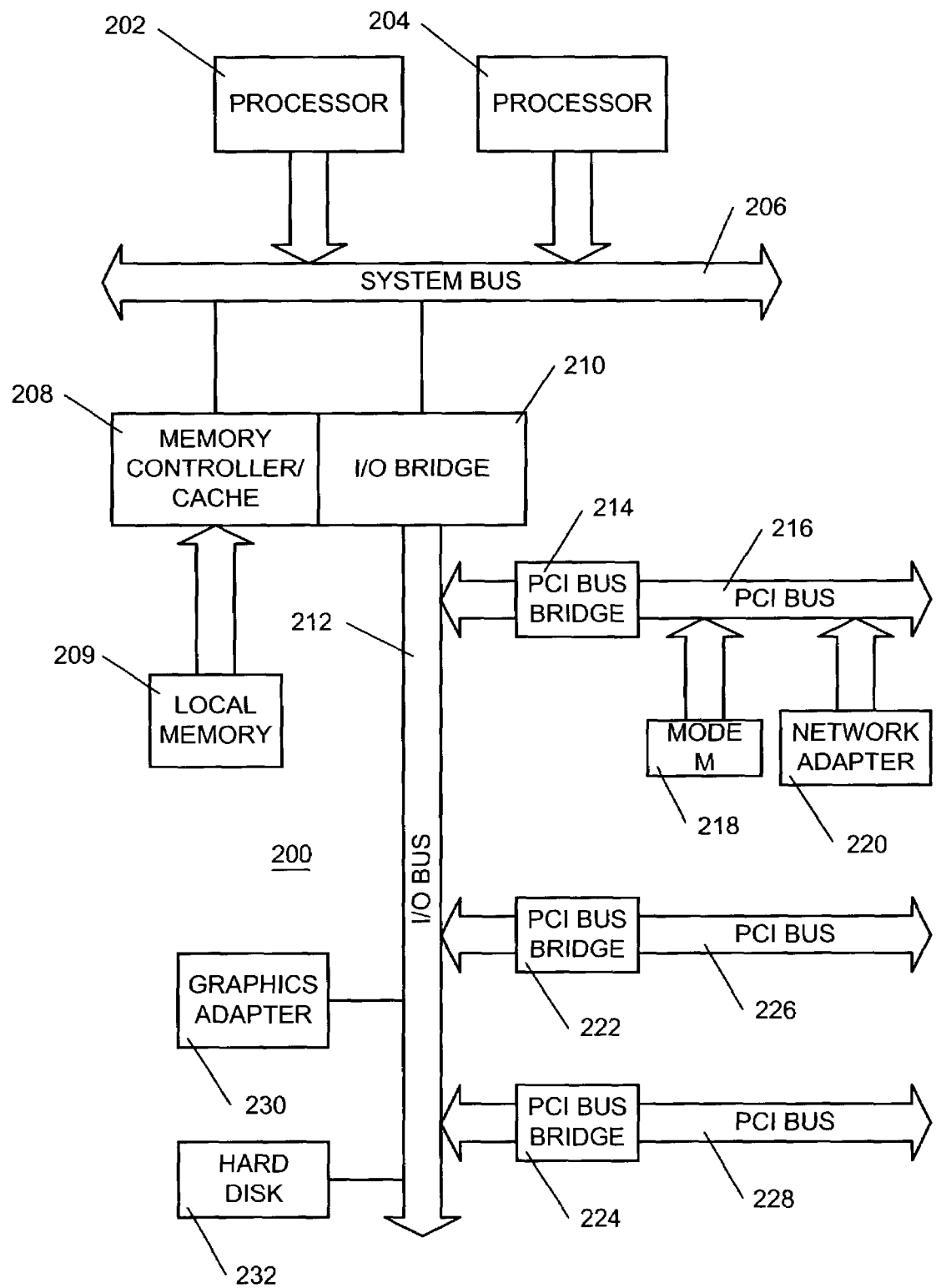
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
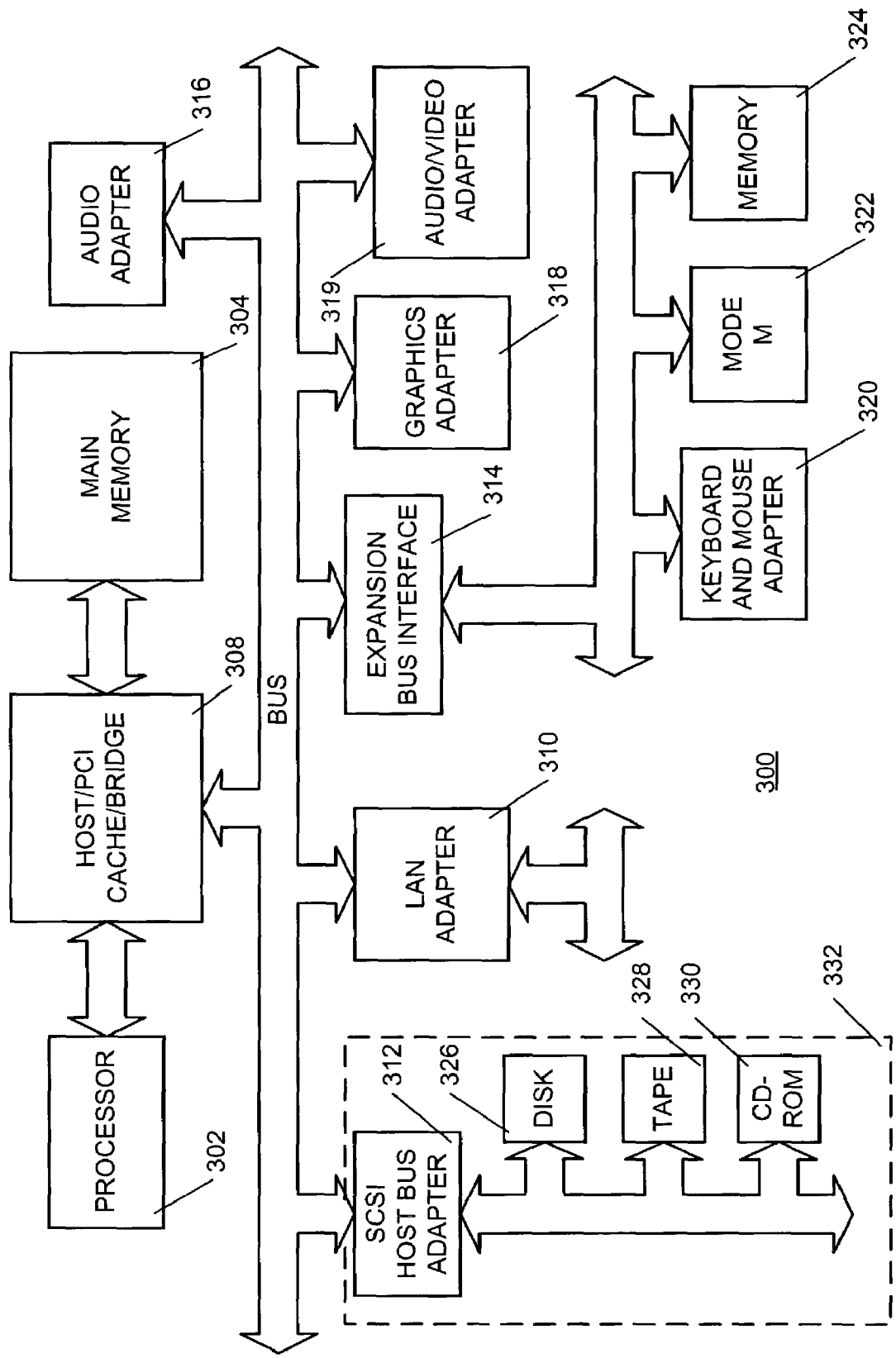
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides a method of determining when there is a possibility that a user may be communicating with a system other than an intended one and to warn the user of such possibility. The invention may be local to server 104 or to client systems 108, 110 and 112 of FIG. 1 or to both the server 104 and clients 108, 110 and 112 so long as the clients are not diskless. Further, the present invention may reside on any data storage medium (i.e., floppy disk, compact disk, hard disk, ROM, RAM, etc.) used by a computer system.

When a host is requesting a DNS name service, instead of sending the request to one DNS server, the request may be sent to two or more DNS servers in the list contained in /etc/resolv.conf. If all the DNS servers return the same IP address, there is a high likelihood that the IP address is indeed the IP address of the computer system that the user wants to communicate with. If the DNS servers return two or more different IP addresses, then one or more of the IP addresses may not be authentic. Thus, there is a likelihood that if any one of the returned IP addresses is used the user will not be communicating with the intended computer system. Consequently, a message may be generated warning the user that communication with this computer system may be compromised.

Figure 4:
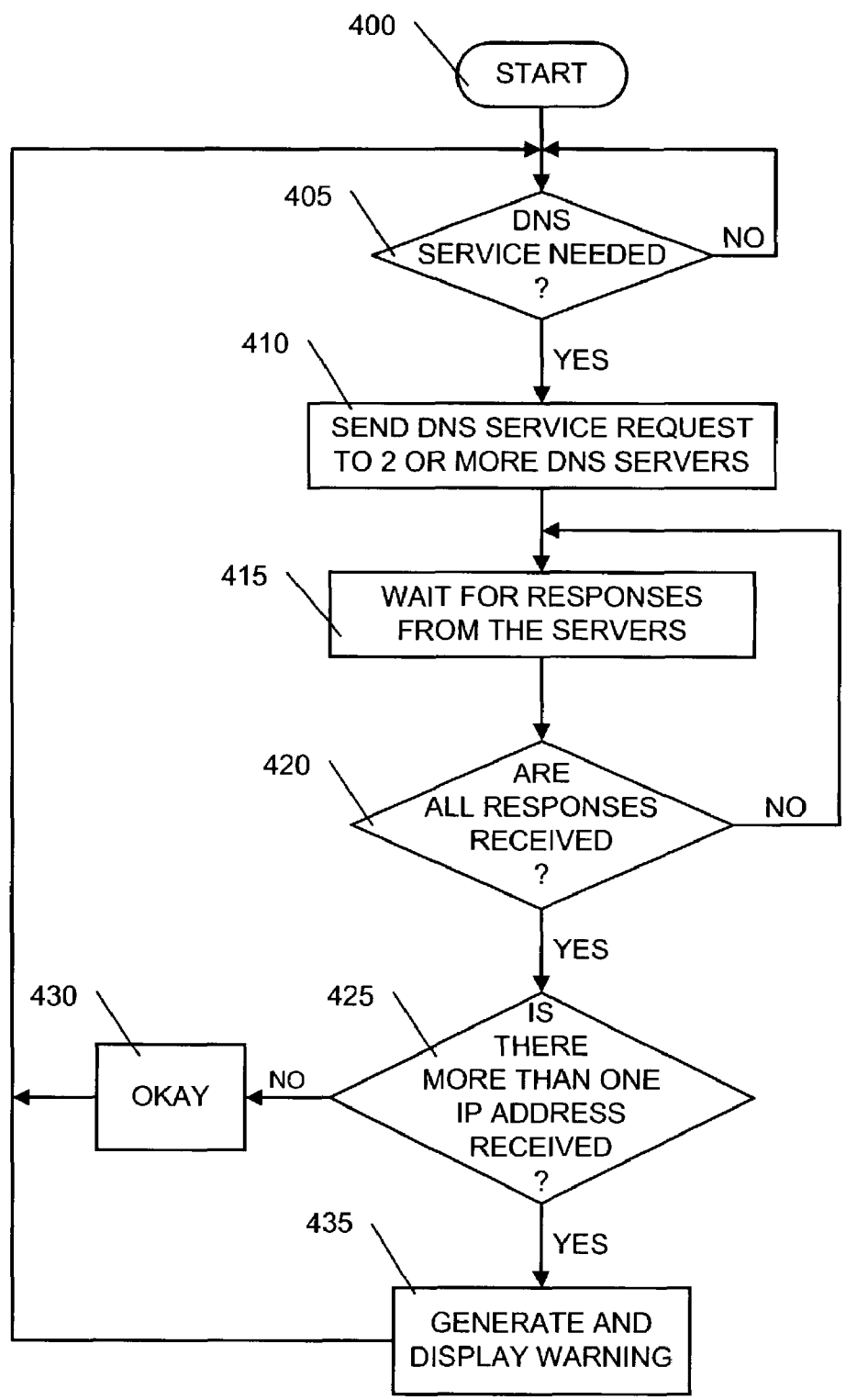
FIG. 4 is a flow chart of a process that may be used when implementing the invention.

FIG. 4 is a flow chart of a process that may be used to implement the invention. The process starts when the computer system is turned or refreshed (step 400). Then a check is made to determine whether a DNS service is needed. If so the /etc/resolv.conf file is consulted for which DNS servers to request the service from. Depending on the implementation two or more of the DNS servers in the file may be contacted. Again, depending on the implementation as soon as the first response (i.e., IP address) is received, the client system may contact the computer system whose IP address it has obtained. In the alternative, the client system may wait until all the contacted servers have responded to the request. At this time, it is determined whether all the contacted servers returned the same IP address. If so, it is safe to contact the intended computer system. If there is more than one IP address returned, then a message may be generated warning the user that the intended computer system may not be the one contacted (steps 405–435).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of communicating between a first and second computer systems comprising the steps of:
   - determining, by the first computer system upon a command by a user on the first computer system to have the first computer system communicate with the second computer system, whether communication with the second computer system may be compromised by requesting an IP address from two or more DNS servers, the IP address being the address of the second computer system;
   - generating a notification, if it is determined that the communication may be compromised, that communication with the second computer system may be compromised; and
   - providing the notification to the user.

2. The method of claim 1 wherein if the two or more DNS servers return two or more different IP addresses, communication with the second computer system may be compromised.

3. The method of claim 2 wherein if the two or more DNS servers return the same IP address, communication with the second computer system may not be compromised.

4. A method of double-checking an IP address provided by a DNS server to determine whether the IP address is authentic comprising the steps of:
   - requesting the IP address from two or more DNS servers; and
   - determining that the IP address is authentic if all the contacted DNS servers return the IP address.

5. The method of claim 4 wherein if one or more DNS servers return a different IP address from the other DNS servers one of the IP addresses returned is not authentic.

6. The method of claim 5 wherein if one of the IP addresses returned is not authentic, a warning is generated specifying that communication may be compromised.

7. A computer program product on a computer readable medium for facilitating communication between a first and second computer systems comprising:
   - code means for determining, by the first computer system upon a command by a user on the first computer system to have the first computer system communicate with the second computer system, whether communication with the second computer system may be compromised by requesting an IP address from two or more DNS servers, the IP address being the address of the second computer system;
   - code means for generating a notification, if it is determined that the communication may be compromised, that communication with the second computer system may be compromised; and
   - code means for providing the notification to the user.

8. The computer program product of claim 7 wherein if the two or more DNS servers return two or more different IP addresses, communication with the second computer system may be compromised.

9. The computer program product of claim 8 wherein if the two or more DNS servers return the same IP address, communication with the second computer system may not be compromised.

10. A computer program product on a computer readable medium for double-checking an IP address provided by a DNS server to determine whether the IP address is authentic comprising:
    - code means for requesting the IP address from two or more DNS servers; and
    - code means for determining that the IP address is authentic if all the contacted DNS servers return the IP address.

11. The computer program product or claim 10 wherein if one or more DNS servers return a different IP address from the other DNS servers one of the IP addresses returned is not authentic.

12. The computer program product of claim 11 wherein if one of the IP addresses returned is not authentic, a warning is generated specifying that communication may be compromised.

13. An apparatus for facilitating communication between a first and second computer systems comprising:
    - means for determining whether communication between the first and the second computer system may be compromised, the communication between the first and the second computer systems being instituted upon a command by a user on the first computer system to have the first computer system communicate with the second computer system by requesting an IP address from two or more DNS servers, the IP address being the address of the second computer system;
    - means for generating a notification if it is determined that the communication may be compromised; and
    - means for providing the notification to the user.

14. The apparatus of claim 13 wherein if the two or more DNS servers return two or more different IP addresses, communication with the second computer system may be compromised.

15. The apparatus of claim 14 wherein if the two or more DNS servers return the same IP address, communication with the second computer system may not be compromised.

16. An apparatus for double-checking an IP address provided by a DNS server to determine whether the IP address is authentic comprising;
   means for requesting the IP address from two or more DNS servers; and
   means for determining that the IP address is authentic if all the contacted DNS servers return the IP address.

17. The apparatus of claim 16 wherein if one or more DNS servers return a different IP address from the other DNS servers one of the IP addresses returned is not authentic.

18. The apparatus of claim 17 wherein if one of the IP addresses returned is not authentic, a warning is generated specifying that communication may be compromised.

19. A first computer system for communicating with a second computer system comprising:
   at least one storage device for storing code data; and
   at least one processor for processing the code data to determine whether communication with the second computer system may be compromised by requesting an IP address from two or more DNS servers, the IP address being the address of the second computer system, the communication between the first and the second computer systems being instituted upon a command by a user on the first computer system to have the first computer system communicate with the second computer system, to generate a notification, if it is determined that the communication may be compromised and to provide the notification to the user.

20. The first computer system of claim 19 wherein if the two or more DNS servers return two or more different IP addresses, communication with the second computer system may be compromised.

21. The first computer system of claim 20 if the two or more DNS servers return the same IP address, communication with the second computer system may not be compromised.

22. A computer system for double-checking an IP address provided by a DNS server to determine whether the IP address is authentic comprising:
   at least one storage device for storing code data; and
   at least one processor for processing the code data to request the IP address from two or more DNS servers, and to determine that the IP address is authentic if all the contacted DNS servers return the IP address.

23. The computer system of claim 22 wherein if one or more DNS servers return a different IP address from the other DNS servers one of the IP addresses returned is not authentic.

24. The computer system of claim 23 wherein if one of the IP addresses returned is not authentic, a warning is generated specifying that communication may be compromised.

* * * * *